June 23, 1925. 1,543,091
J. T. BERTHELOTE
STILE
Filed April 16, 1924 2 Sheets-Sheet 1
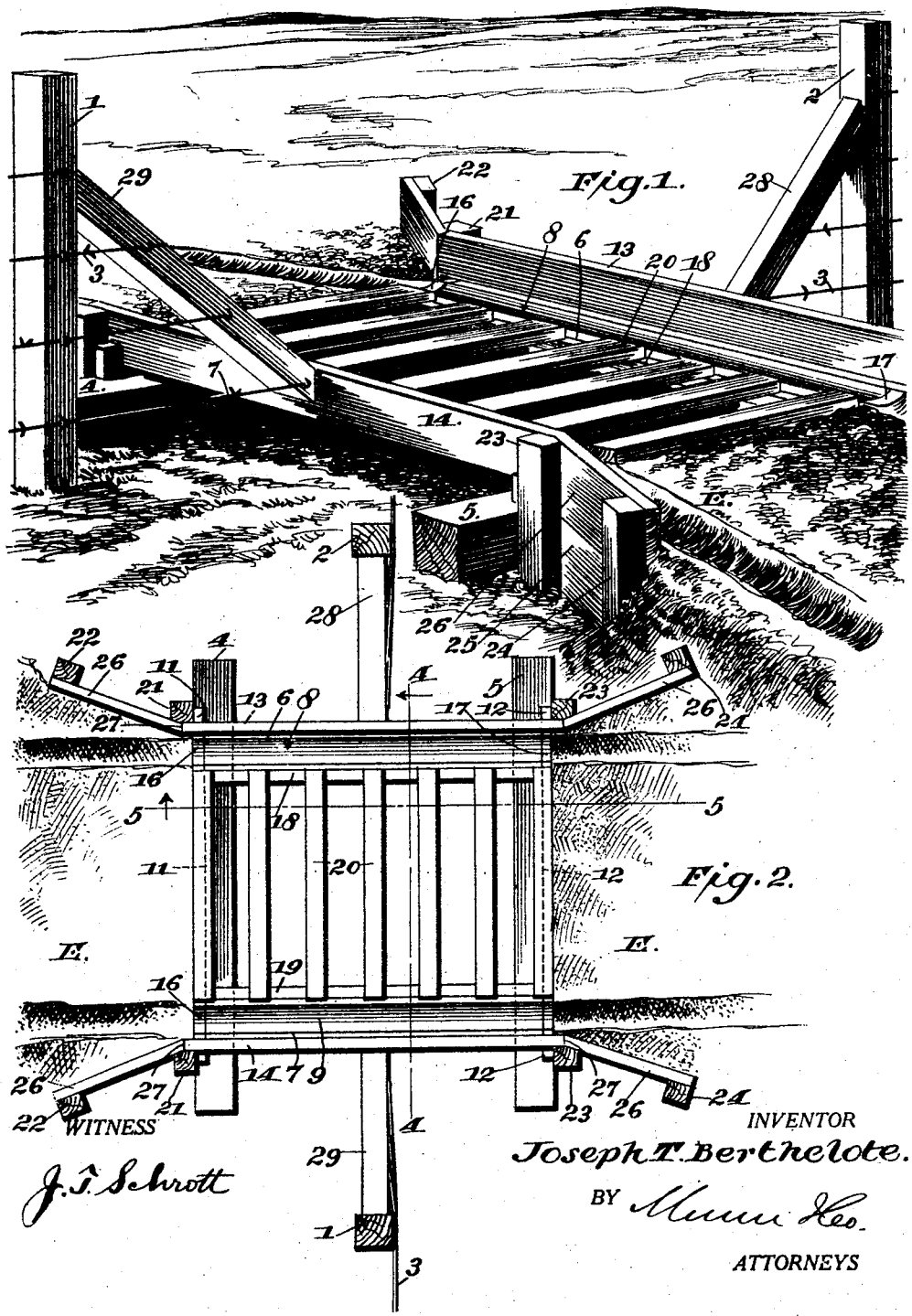
WITNESS
J. T. Schrott
INVENTOR
Joseph T. Berthelote.
BY
ATTORNEYS June 23, 1925.
J. T. BERTHELOTE
STILE
Filed April 16, 1924
1,543,091
2 Sheets-Sheet 2
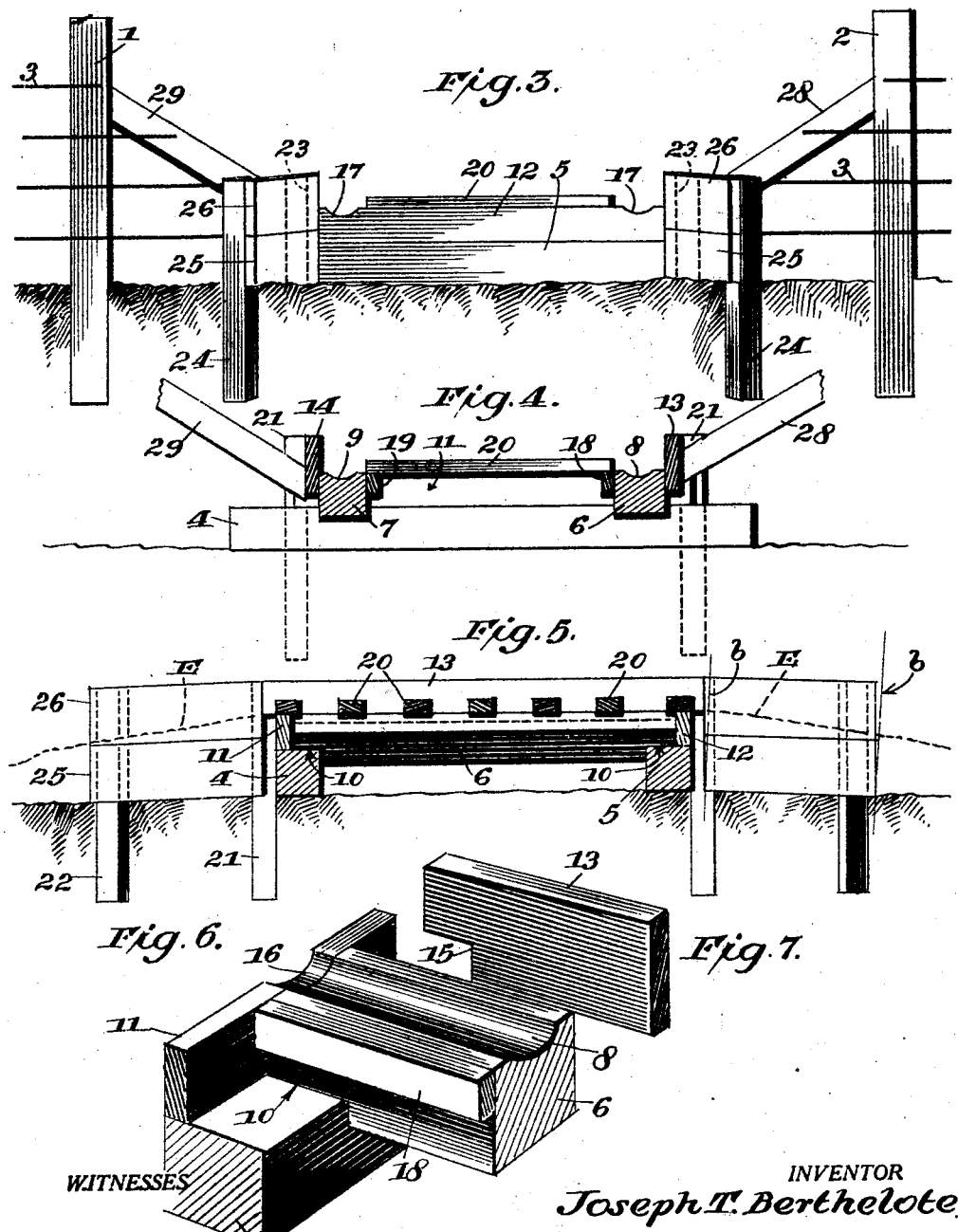
INVENTOR
Joseph T. Berthelote
BY
ATTORNEYS Patented June 23, 1925.

1,543,091

UNITED STATES PATENT OFFICE.

JOSEPH THOMAS BERTHELOTE, OF GOLDBUTTE, MONTANA.

STILE.

Application filed April 16, 1924. Serial No. 707,006.

*To all whom it may concern:*

Be it known that I, JOSEPH T. BERTHELOTE, a citizen of the United States, and a resident of Goldbutte, in the county of Toole and State of Montana, have invented certain new and useful Improvements in Stiles, of which the following is a specification.

My invention relates to improvements in stiles, and its consists of the constructions, combinations, and arrangements herein described and claimed.

An object of the invention is to provide a means for the passage of automobiles and other motor vehicles through fences and the like used for the purpose of confining cattle.

A further object of the invention is to provided a stile adapted to be situated in a gate opening in a fence and arranged for the passage of a motor vehicle without necessitating the occupant getting out to open a gate, an additional feature being that live stock is prevented from escaping at the opening.

A further object of the invention is to provide a stile which can be used as a bridge across small streams, ditches and the like, for the passage of motor vehicles, there being a series of rather widely spaced cross planks between wheels tracks to prevent cattle from walking across.

Other objects and advantages will appear in the following specification, reference being had to the accompanying drawings in which:

Figure 1 is a perspective view illustrating the stile in use,

Figure 2 is a plan view,

Figure 3 is an elevation of one approach before making the earth fill,

Figure 4 is a cross section on the line 4—4 of Figure 2,

Figure 5 is a longitudinal section on the line 5—5 of Figure 2,

Figure 6 is a detail perspective view of one corner of the stile,

Figure 7 is a detail perspective view of the adjacent end of one of the wheel guards.

As is generally stated in the objects of the invention the purpose is to make it possible to traverse an opening or openings in a fence while in a motor vehicle without making is necessary for the driver or other occupants to descend, and at the same time, make it impossible for cattle confined by the fence to escape. All this is made quite clear in the drawings.

The posts 1 and 2 are to be regarded as parts of a fence which includes the wires 3 to complete an enclosure. The wires stop at a place where it is proposed to leave an opening for the passage of automobiles. Such an opening is shown in Figure 1. It is desirable to make the passage of the automobile easy, yet necessary to prevent the escape of cattle from the enclosure. The latter is accomplished without the use of a movable gate, bars or the like.

A pair of heavy sills 4 and 5 are laid upon the ground in a position parallel to the fence. Track timbers 6 and 7 are laid crosswise upon these in the direction of the fence opening. These timbers are spaced according to the standard distance between automobile wheels so that the latter may run in the shallow grooves 8 and 9 provided for the purpose.

The ends of the track timbers are rabbeted or recessed at 10 (Figure 6) both to gauge the position of the ground sills and enable a more stable connection of the track timbers. The extremities of the track timbers fall short outside of the sills 4 and 5, and abut end planks 11 and 12 which for the puropse, stand edge on upon the sills (Figures 5 and 6). The ends of the end planks extend beyond the sides of the track timbers so as to provide material upon which to rest the wheel guards 13 and 14. These end planks are for the purpose of keeping the earth fills at the approaches from falling over the ground sills.

Rabbets or recesses 15 at the ends of the wheels guards seat upon said extremities as well shown in Figure 1, and suggested in Figures 6 and 7. The end planks are hollowed at 16 and 17 to provide continuations of the grooves in the track timbers.

Fixed inside of the track timbers 6 and 7 are supports 18 and 19 by which a series of cross planks 20 are carried. These are spaced considerable distances apart, and being rather narrow, (approximately 4 inches) make it impossible for cattle to walk across. Furthermore, the stile is sufficiently long to discourage jumping.

The ends of the supports 18 and 19 abut the end planks 11 and 12 (Figures 5 and 6) and the cross planks 20 stand thereabove the distance of the thickness thereof. A plurality of guard posts 21, 22 and 23, 24 are so driven into the ground as to permit fastening the guide or approach boards in diverging position.

These consists of base and top boards 25 and 26 stood edge on as shown for the purpose of retaining an earth or cinder fill E at each approach to the stile. The earth fill is made necessary by the elevation of the track timbers 6 and 7 above the ground surface.

In order that the boards may both slant outward and slightly downward (note Figures 2, 3 and 5) it becomes necessary to cut them on a bias in reference to the lateral dimension (compare dotted lines $b$ and the full lines in Figure 5) and also bevel them at 27.

Guards 28 and 29 prevent passage of cattle through the fence opening beside the stile. These guards are beveled at each end and fastened both to the fence posts and adjacent guards 13 and 14. The fence wires 3 are carried across the intervening gap and fastened to the guards to make the barrier complete.

Use of nails is ordinarily made in fastening the various elements of the stile together. The nail heads are not indicated in the drawings inasmuch as the appearance thereof is quite obvious.

In ordinary practice the sills 4 and 5 are laid upon the level ground at a place where an opening occurs in a fence. The track timbers 6 and 7 and other parts are then built in place. A suitable wood preservative is applied, whereupon several coats of paint are given to protect the material. The earth fill E is finally made to complete the approaches.

The same principle of construction will prevail when the stile is used as a bridge across small streams, ditches and the like. One of the purposes in connection with the invention is to furnish sets of plans and description according to a predetermined selection of materials and a mode of assembly substantially as herein disclosed, so that those obtaining the foregoing may proceed with the erection of the stile, whether it be intended to use the same as a gate or bridge.

While the construction and arrangement is substantially as herein described and claimed, obviously modifications and changes may be made without departing from the spirit of the invention or scope of the claims.

I claim:—

1. In combination with a fence having an opening, a stile situated in said opening having grooved side timbers providing fixed tracks for the wheels of a vehicle, and means fixed in position upon and between tracks preventing an animal from walking through.

2. In combination with a fence having an opening, a stile situated in said opening having side timbers providing fixed tracks for the wheels of a vehicle, means in spaced relation mounted at the ends upon said timbers preventing an animal from walking through, and means in continuation of the fence extending down adjacent to the tracks preventing the animal from passing through beside the tracks.

3. In combination with a fence having an opening, a stile situated in said opening having grooved side timbers constituting vehicle tracks, a plurality of spaced bars laid crosswise between the tracks from end to end preventing an animal from walking through, means carried by the side timbers to which said bars are attached, and means in continuation of the fence extending down adjacent to the track means preventing the animal from passing through beside the track means.

4. A device of the character described, comprising sills laid parallel to a fence at an opening therein, track timbers laid upon the sills in the direction of the opening, a series of cross planks spaced to prevent an animal from walking across, means carried by the track timbers to which the planks are applied at the ends, an earth fill at each approach to the device, and means at each approach for confining said fill.

5. A device of the character described, comprising sills laid parallel to a fence at an opening therein, track timbers laid upon the sills in the direction of the opening, a series of cross planks situated in the space between the track timbers being spaced to prevent an animal from walking across, supports carried inside of the track timbers flush with the top surface upon which said planks are secured, guards carried outside of the track timbers preventing a vehicle from running off, guide planks extending from the ends of said guards in diverging positions, an earth fill confined by said guide planks and forming approaches up to said cross planks, and end planks so placed across as to prevent the earth from falling through over the sills and beneath the cross planks.

6. A stile comprising a pair of sills, track timbers supported upon the sills at the ends and having wheel grooves, end planks placed at the ends of the track timbers to provide closures and having concavities corresponding with said grooves, wheel guards situated outside of the track timbers, supports inside of the track timbers, guides situated in continuation of the wheel guards in diverging positions, earth fills confined by said guides providing approaches extending to the tops of the end planks, and a series of spaced cross planks having the ends mounted upon said supports.

7. A stile comprising a pair of sills, track timbers having recessed ends mounted upon said sills and provided with wheel grooves, end planks placed across and extending beyond the track timbers and having concavities corresponding with the wheel grooves, wheel guards outside of said timbers having recessed ends mounted upon the extension of the end planks, supports inside of the track timbers, spaced across planks fastened upon the supports at the ends, guides in substantial continuation of the guards, posts driven into the ground to which said guides are secured in diverging positions, and earth fills at each approach of the stile confined at the sides by said guides.

JOSEPH THOMAS BERTHELOTE.